US012639442B2

(12) United States Patent
　　Zhang

(10) Patent No.: US 12,639,442 B2
(45) Date of Patent: May 26, 2026

(54) SECURE AND TRUSTED USE METHOD AND SYSTEM FOR LARGE MODEL BASED ON CONFIDENTIAL COMPUTING

(71) Applicant: Nanhu Laboratory, Jiaxing (CN)

(72) Inventor: Lei Zhang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 19/241,508

(22) Filed: Jun. 18, 2025

(65) Prior Publication Data

US 2025/0384134 A1　　Dec. 18, 2025

(30) Foreign Application Priority Data

Jun. 18, 2024　(CN) .......................... 202410786293.4

(51) Int. Cl.
*G06F 21/57*　　(2013.01)
*G06F 21/64*　　(2013.01)

(52) U.S. Cl.
CPC .............. *G06F 21/57* (2013.01); *G06F 21/64* (2013.01)

(58) Field of Classification Search
CPC ................................ G06F 21/57; G06F 21/64
USPC .......................................................... 726/22
See application file for complete search history.

(56) References Cited

U.S. PATENT DOCUMENTS

| | | | | |
|---|---|---|---|---|
| 12,073,930 | B1* | 8/2024 | Alperin ................. | G06N 20/10 |
| 2024/0346162 | A1* | 10/2024 | Luitjens ............. | H04L 63/0407 |
| 2025/0086309 | A1* | 3/2025 | Harinath ............ | G06F 21/6245 |
| 2025/0307418 | A1* | 10/2025 | Spencer ............... | G06F 21/577 |

FOREIGN PATENT DOCUMENTS

| | | |
|---|---|---|
| CN | 104917615 A | 9/2015 |
| CN | 113569266 A | 10/2021 |
| CN | 115587379 A | 1/2023 |
| CN | 115730338 A | 3/2023 |
| CN | 117725610 A | 3/2024 |
| CN | 117992481 A | 5/2024 |

* cited by examiner

*Primary Examiner* — Moeen Khan
(74) *Attorney, Agent, or Firm* — Bayramoglu Law Offices LLC

(57)　　　　ABSTRACT

Provided is a secure and trusted use method and system for a large model based on confidential computing. In the method, a desensitization service party starts a service in a confidential computing environment; the confidential computing environment establishes a secure connection with a user terminal and the large model separately; the service receives, in the confidential computing environment, original data uploaded by the user terminal, and desensitizes the original data to obtain desensitized data; and the service sends the desensitized data to the large model based on the secure connection between the confidential computing environment and the large model. In this scheme, a third party is used to desensitize the data before utilizing the large model, and a targeted solution is provided to address the issue of third-party data leakage. Confidential computing is applied to the usage scenario of the large model, with the third-party service performing desensitization.

6 Claims, 3 Drawing Sheets

SECURE AND TRUSTED USE METHOD AND SYSTEM FOR LARGE MODEL BASED ON CONFIDENTIAL COMPUTING

CROSS REFERENCE TO THE RELATED APPLICATIONS

This application is based upon and claims priority to Chinese Patent Application No. 202410786293.4, filed on Jun. 18, 2024, the entire contents of which are incorporated herein by reference.

TECHNICAL FIELD

The present disclosure relates to the technical field of secure computing for large model authorization information, and in particular, to a secure and trusted use method and system for a large model based on confidential computing.

BACKGROUND

At present, large models are widely used in various applications, but the use of large models raises significant privacy concerns. During the process of using a large model, users may send text containing personal and sensitive information directly to the large model for inference or training. This information is then transmitted to the server of the model provider, which introduces privacy leakage risks.

To address the issue of data privacy when using large models, there are two initial approaches:

1. The user terminal deploys de-anonymization services locally, such as the Hide and Seek (HaS) technology for privacy protection of large models disclosed by Tencent Xuanwu Lab.

2. Deploy the large model locally on the user terminal.

Both of the above two methods have their drawbacks. The first one has a relatively high implementation cost, as it requires local deployment of services and adapted hardware, and is also not very convenient to use. The second one also requires users to deploy high-performance hardware devices to support the operation of large models, but ordinary users typically lack such resources, limiting its widespread adoption.

Centralized desensitization services can address the data privacy issues associated with the use of large models. Users send large model inference data to the centralized desensitization service party, where the server anonymizes or filters out sensitive information before sending the information to the large model for inference/training. The inference result of the large model is then returned to the user. This approach requires no deployment on the user terminal and imposes no hardware requirements on the user terminal. However, the technology behind centralized desensitization services does not fully resolve the issue of data leakage to third parties. To be specific, based on this technology, the large model does indeed receive desensitized data, but the original data is still submitted to the centralized anonymization service. This means that the centralized anonymization service still has access to sensitive information. Moreover, this approach requires that the relevant authorization information for using the large model (such as the user name, password, or token) also be transmitted through the centralized anonymization service to the large model. As a result, the centralized anonymization service can access not only the sensitive data but also the user authorization information for using the large model, which still poses security risks.

SUMMARY

The objective of the present disclosure is to address the above issues and construct a secure and trusted use method for a large model based on confidential computing. The method includes:

starting, by a desensitization service party, a service in a confidential computing environment;

establishing, by the confidential computing environment, a secure connection with a user terminal;

establishing, by the confidential computing environment, a secure connection with the large model;

receiving, by the service in the confidential computing environment, original data uploaded by the user terminal, and desensitizing the original data to obtain desensitized data; and sending, by the service, the desensitized data to the large model based on the secure connection between the confidential computing environment and the large model, for training, analysis, or inference.

In the secure and trusted use method for a large model based on confidential computing, the confidential computing environment establishes the secure connection with the user terminal after the user terminal performs trustworthiness verification on the confidential computing environment and verifies that the confidential computing environment is trustworthy.

In the secure and trusted use method for a large model based on confidential computing, a method for the user terminal to perform trustworthiness verification on the confidential computing environment includes:

starting, by the service, a confidential computing environment service and invoking a chip-level confidential computing application programming interface (API) to generate a chip-level report;

generating, by the service, a public-private key pair P-S in the confidential computing environment, and issuing a self-signed certificate using a private key S;

sending the chip-level report and the self-signed certificate to the user terminal; and verifying, by the user terminal, the self-signed certificate using a public key P, validating authenticity of the chip-level report using a confidential computing certificate chain, and verifying validity of the service using service-related information (for example, an application hash value) in the chip-level report; if the verification succeeds and the self-signed certificate is valid, the service is verified as trusted; or otherwise, the service is verified as untrusted.

In the secure and trusted use method for a large model based on confidential computing, after the verification succeeds, the user terminal requests to establish a remote secure connection with the confidential computing environment using the self-signed certificate and the information in the chip-level report.

In the secure and trusted use method for a large model based on confidential computing, the service running in the confidential computing environment provides the user terminal with a user web service interface containing a dialog box between a user and the large model, to receive the original data, and desensitizes the original data after receiving.

In the secure and trusted use method for a large model based on confidential computing, during the desensitization process, the service establishes a mapping table between sensitive data and corresponding replacement data in the confidential computing environment; and the method further includes: receiving, by the service through the secure connection between the confidential computing environment and the large model, an inference result returned by the large model, restoring relevant desensitized data in the inference result to sensitive data based on the mapping table, and then returning the inference result to the user terminal through the secure connection.

In the secure and trusted use method for a large model based on confidential computing, the method further includes: receiving, by the service running in the confidential computing environment, authorization information uploaded by the user through the secure connection and required for the user to use the large model, and sealing the authorization information based on a trusted sealing technology for confidential computing; and after desensitizing the original data to obtain the desensitized data, reading, by the service based on the trusted sealing technology, the authorization information corresponding to the current user, and sending the authorization information to the large model through the secure connection between the confidential computing environment and the large model, to trigger use of the large model by the user. Taking the authorization information as an example, sealed data may be a user-token correspondence table. During use, the user token is extracted based on the user identity.

A secure and trusted use system for a large model based on confidential computing includes a user terminal, a desensitization service party, and a large model party, where the desensitization service party includes a confidential computing environment, the confidential computing environment establishes a secure connection with the user terminal and the large model party separately, and at least a desensitization service, a large model interaction service, and a confidential computing service of the desensitization service party are started and run in the confidential computing environment to desensitize original data uploaded by a user through the secure connection and send desensitized data to the large model party through the secure connection.

In the secure and trusted use system for a large model based on confidential computing, the desensitization service party further includes a user web service that is started and runs in the confidential computing environment, to provide the user terminal with a user web service interface containing a dialog box between the user and the large model, to receive the original data; and in the desensitization process of the desensitization service, a mapping table between sensitive data and corresponding replacement data is established in the confidential computing environment; and the desensitization service party further includes a re-identification service that is started and runs in the confidential computing environment, and is used for restoring, to the sensitive data based on the mapping table, relevant desensitized data in an inference result returned by the large model, and returning the inference result to the user terminal through the secure connection.

Further, in the desensitization process, the following may further be adopted:

In the secure and trusted use system for a large model based on confidential computing, the confidential computing service is further used for: receiving authorization information uploaded by the user through the secure connection and required for the user to use the large model, and sealing the authorization information based on a trusted sealing technology for confidential computing; and when the user needs to use the large model, reading the authorization information corresponding to the current user based on the trusted sealing technology, and sending the authorization information to the large model through the secure connection between the confidential computing environment and the large model based on the large model interaction service, to trigger use of the large model by the user.

The present disclosure has the following advantages:

This scheme addresses the issue of third-party leakage in centralized anonymization services by proposing a targeted solution. Confidential computing is applied to the usage scenario of the large model, with the third-party service performing desensitization. In addition, the main services of the third-party service are deployed within the confidential computing environment, to perform desensitization and re-identification on user data within the confidential computing environment. This solution ensures the security of the user data (including user inference data, inference result data, and token information used by the user for the large model) throughout the entire lifecycle. The data remains inaccessible to all parties, including the third-party service and the large model.

The token used by the user for the large model can be sealed by the desensitization service party of the third-party confidential computing based on the process of the scheme, and cannot be accessed. The desensitization service party of the third-party confidential computing interacts with the large model in the confidential computing environment using the token, while ensuring that no plaintext data is exposed, thereby maintaining the security of the token. Additionally, the user does not need to send token-related information every time interacting with the large model.

This scheme does not require any changes to the large model or the usage process of the large model party while protecting the sensitive information, which is highly practical.

After the user registers with the third-party service, the use experience is identical to directly interacting with the large model, with no changes to the process, ensuring ease of use. The registration of the user terminal with the desensitization service party can be completed within the confidential computing environment during the initial connection.

DETAILED DESCRIPTION OF THE EMBODIMENTS

The present disclosure is further described in detail below with reference to accompanying drawings and specific examples.

This scheme provides a secure and trusted use method and system for a large model based on confidential computing, including three parts: a user terminal, a desensitization service party, and a large model party. The desensitization service party is a third-party centralized platform, and related services are deployed in a confidential computing environment.

Embodiment 1

Figure 1:
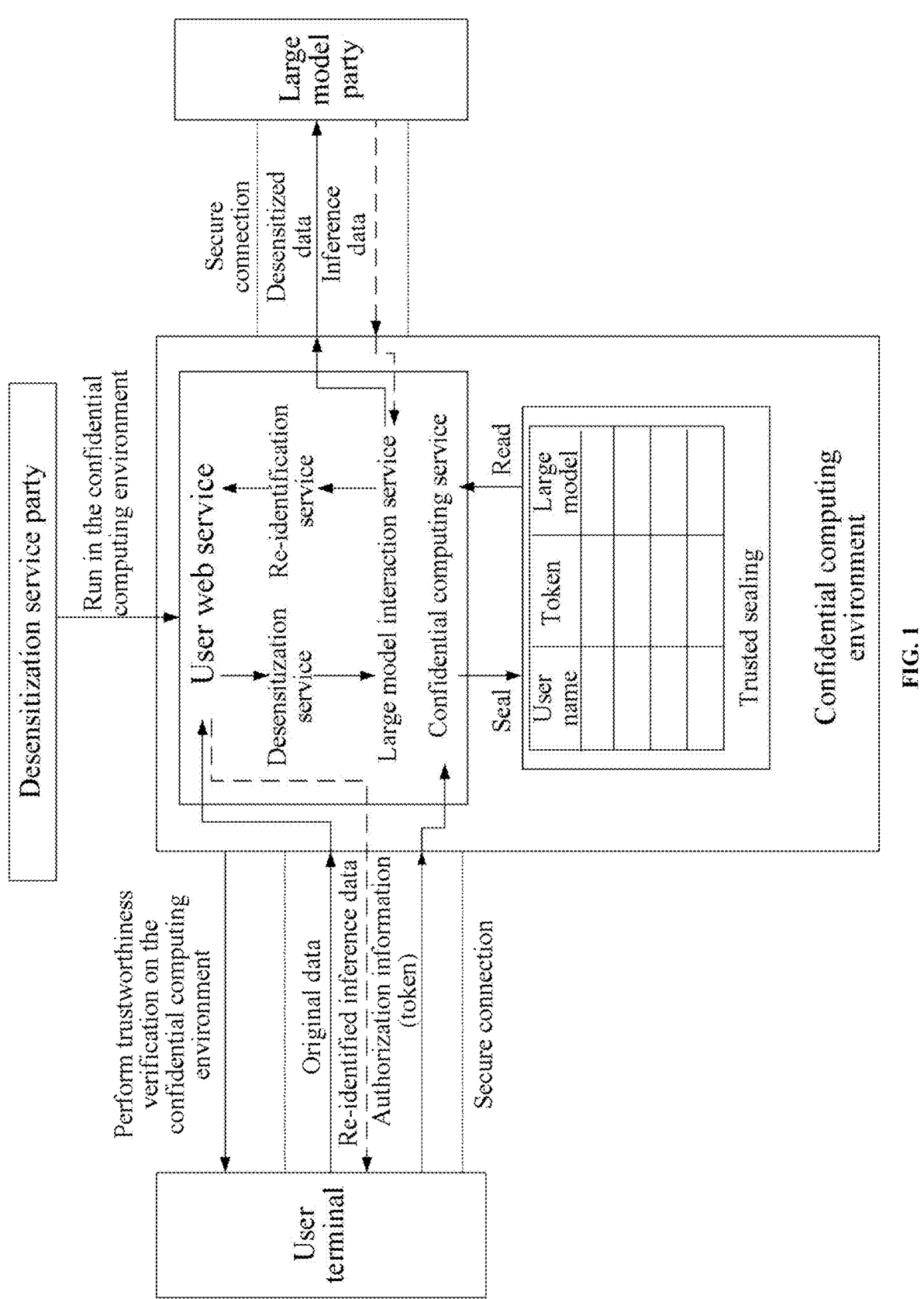
FIG. 1 is an architecture and implementation flowchart of a secure and trusted use system for a large model based on confidential computing according to Embodiment 1 of the present disclosure.

As shown in FIG. 1, an implementation procedure of the present disclosure is as follows:

1. The desensitization service party starts services in the confidential computing environment. These services started and running in the confidential computing environment include a user web service, a desensitization service, a re-identification service, a large model interaction service, and a confidential computing service. Confidential computing refers to confidential computing/privacy computing based on the central processing unit (CPU) level. Encrypted data is only decrypted and computed in the CPU-level trusted execution environment (TEE) (encrypted memory). Upon completion of computation, related data is destructed in the highly trusted environment, and decrypted plaintext data is not leaked in the whole process. The data-based computation is performed in the CPU-level TEE (encrypted memory), and no one (including the highest administrator for running the host or the owner having a control right for the Kernel hierarchy) can invade the CPU-level TEE to tamper the operations.

Figure 2:
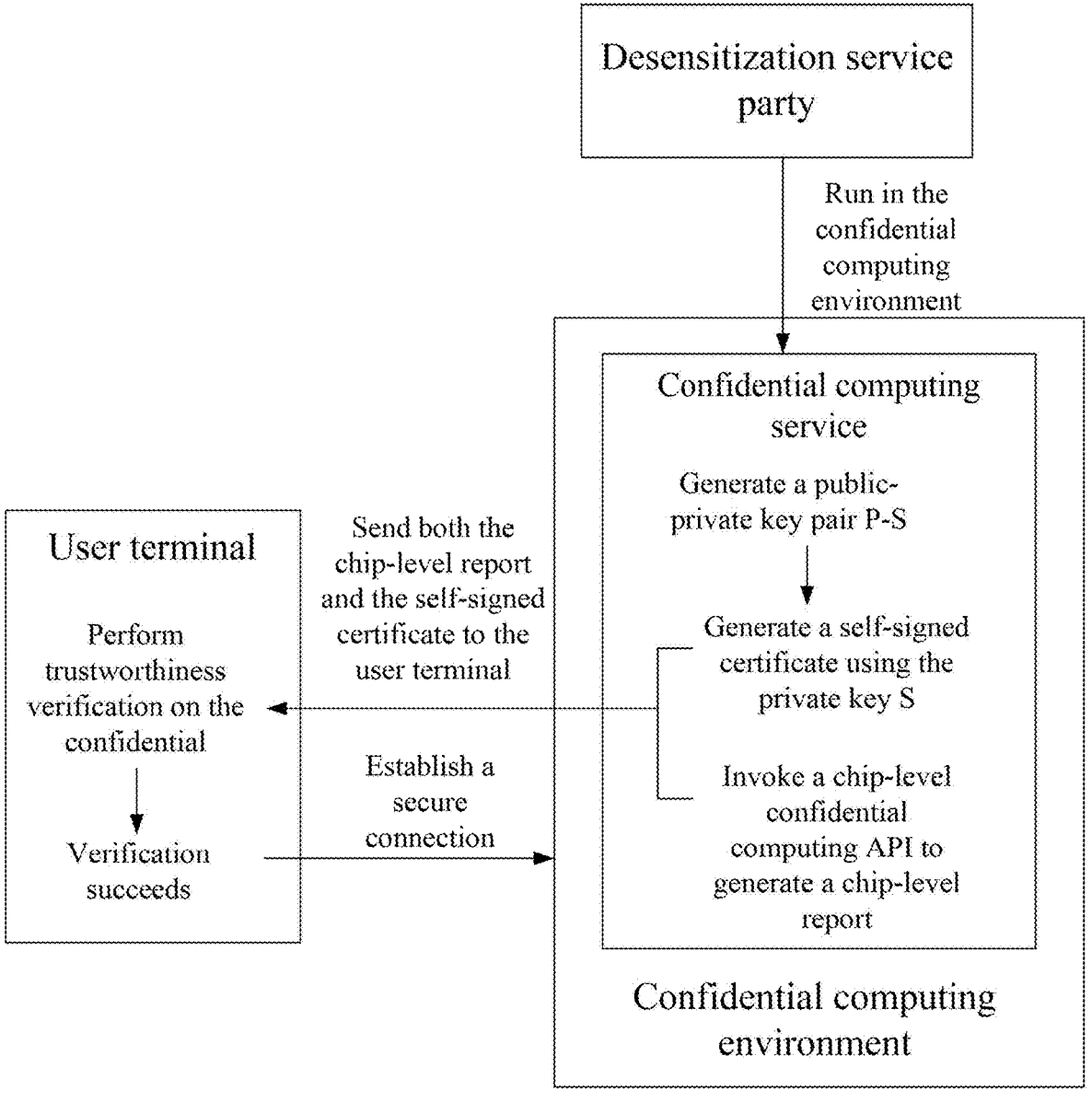
FIG. 2 is a flowchart of establishing a secure connection between a user terminal and a confidential computing environment according to Embodiment 1 of the present disclosure.

2. As shown in FIG. 2, in the confidential computing environment of the desensitization service party, the confidential computing service generates a public-private key pair P-S, and issues a self-signed certificate using a private key S, which contains a series of certificate information, such as the identity of the holder and the certificate validity.

3. The user terminal and the confidential computing environment start a remote authentication process for confidential computing, and the confidential computing service invokes a chip-level confidential computing API to generate a chip-level report. The report includes a unique identifier, configuration, version information, service startup information, and an application service unique identifier (such as an application service hash value) of the confidential computing environment.

4. The confidential computing service sends the chip-level report and the self-signed certificate to the user terminal.

5. The user terminal verifies the self-signed certificate using a public key P obtained in advance or provided by the self-signed certificate, validates authenticity of the chip-level report using a confidential computing certificate chain, and extracts service-related information (such as the application hash value) in the chip-level report to verify whether the application is valid (for example, whether the application is on the authorization list). It should be noted that the service party cannot forge the chip-level report and the application information therein, such that the user can trust the content of the chip-level report even if the service party is untrusted.

6. The user terminal establishes a remote secure connection with the confidential computing environment based on the self-signed certificate and the chip-level report of the desensitization service party. The user terminal is directly connected to the service in the remote confidential computing environment. A non-confidential computing environment of the desensitization service party (including the highest administrator of the host of the desensitization service party) cannot view this secure connection and any plaintext information in the confidential computing environment.

7. The user terminal sends, through the secure connection, authorization information required for the user to use the large model, such as a user token or a user key for the large model, to the confidential computing environment of the desensitization service party. The confidential computing service in the confidential computing environment seals the authorization information on a confidential computing hard disk based on a trusted sealing technology for confidential computing. The sealed data may be a user name-token correspondence table. If the desensitization service party only interfaces with a large model party, the correspondence table only needs to record the user name-token correspondence. If the desensitization service party interfaces with more than one large model party, the correspondence table needs to record the user-token-model correspondence. The data sealed using the trusted sealing technology for confidential computing cannot be obtained by the highest administrator of the host of the desensitization service party.

8. The user logs into a user web service interface of the desensitization service party. Because the user web service of the desensitization service party runs in the confidential computing environment, all content sent by the user through this interface is directly sent to the confidential computing environment of the desensitization service party, and the desensitization service party cannot view any information sent by the user.

9. The user web service interface contains a dialog box between the user and the large model, and the user sends original data to the desensitization service party through the user web service interface.

10. The services of the desensitization service party running in the confidential computing environment include a desensitization service, which extracts and desensitizes sensitive information related to the user, and generates a mapping table between the sensitive data and replacement data. For example, the original data uploaded by the user is "I like computers, my name is Wang Wei, my phone number is 13811111111, I am 32 years old, and I am interested in traveling, so help me write a job-hunting self-introduction." The desensitization service desensitizes the data as "I like computers, my name is Zhang Haitian, my phone number is 12322233344, I am in my thirties, and I am interested in traveling, so help me write a job-hunting self-introduction". In this example, the mapping table includes: Wang Wei↔Zhang Haitian, 13811111111↔12322233344, 32 years old↔in my thirties. All private information mentioned by the user during chatting with the large model is replaced, for example, the name "Wang Wei" is replaced with "Zhang Haitian". How sensitive information is extracted and processed is beyond the scope of the present disclosure.

11. The desensitized data may be displayed to the user through the user web service, and a transmission channel is the secure connection in step 6. After the desensitized data is displayed to the user, the user clicks to confirm before proceeding to the next step. Alternatively, the desensitized data is displayed to the user without requiring user confirmation, and the process proceeds directly to the next step. The choice between the two options is made by those skilled in the art based on the specific requirements.

12. The confidential computing service reads the user token corresponding to the user based on the trusted sealing technology, and sends the user token and desensitized inference data through the large model interaction service to the large model for inference.

13. There is no change in the process of the large model party, and the large model inference is carried out. The result is returned to the confidential computing environment of the desensitization service party.

14. The services of the desensitization service party running in the confidential computing environment include a data re-identification service. The related desensitized data in the inference result is restored to sensitive data based on the data mapping table established in step 10. For example, in the above example, the inference result of the large model is "Hello everyone, my name is Zhang Haitian, and my telephone number is 12322233344. I am in my thirties this year. I have a strong interest in computers, which is not only my career choice but also a great passion in my life. Since childhood, I have enjoyed exploring the mysteries of science and technology, and over time, this interest has grown into a deep love for computer science. I am ambitious and eager to learn. Beyond my enthusiasm for computers, I also love traveling. I believe traveling not only broadens my horizons but also sparks new inspiration and creativity." The result after re-identification is "Hello everyone, my name is Wang Wei, and my telephone number is 13811111111. I am thirty-two years old this year. I have a strong interest in computers, which is not only my career choice but also a great passion in my life. Since childhood, I have enjoyed exploring the mysteries of science and technology, and over time, this interest has grown into a deep love for computer science. I am ambitious and eager to learn. Beyond my enthusiasm for computers, I also love traveling. I believe traveling not only broadens my horizons but also sparks new inspiration and creativity."

Preferably, the replacement information for desensitizing information the same user is stored in a single mapping table. The mapping table is determined by using the replacement information with higher uniqueness as the primary key, and the correspondence for all the replacement information is determined using the unique mapping table. For example, above-mentioned Wang Wei↔Zhang Haitian, 13811111111↔12322233344, and thirty-two years old↔in my thirties are stored in the same mapping table, and all users aged 30-40 are replaced with "thirties". This replacement information has relatively low uniqueness, while the name and phone number are replacement information with higher uniqueness. By using types of replacement information together, the mapping table can be uniquely determined, allowing for accurate mapping of user information and enabling re-identification.

15. The confidential computing service of the desensitization service party sends the re-identified result data to the user through the secure channel established in step 6.

Based on the above process, during the inference process of the large model, the user original data is sent to the desensitization service party. The desensitization service party desensitizes the user original data in the confidential computing environment, and triggers the use of the large model based on the large model authorization information of the user (user key or user token), and finally returns to the user the inference result returned by the large model. The large model communicates with the desensitization service party through the secure connection to ensure the security of the authorization information. The secure connection is established in advance, and a specific establishment method is not detailed herein.

In the whole process, the desensitization service party cannot access any sensitive plaintext information of the user, and the sensitive information of the user (including the large model authorization information of the user) cannot be obtained by any other party, including the third-party desensitization service. This effectively mitigates the security risk of service data being leaked to third-party centralized anonymization services.

Embodiment 2

This embodiment is similar to Embodiment 1, with the difference being that the inference result returned by the large model is returned directly to the user terminal without undergoing re-identification.

Embodiment 3

Figure 3:
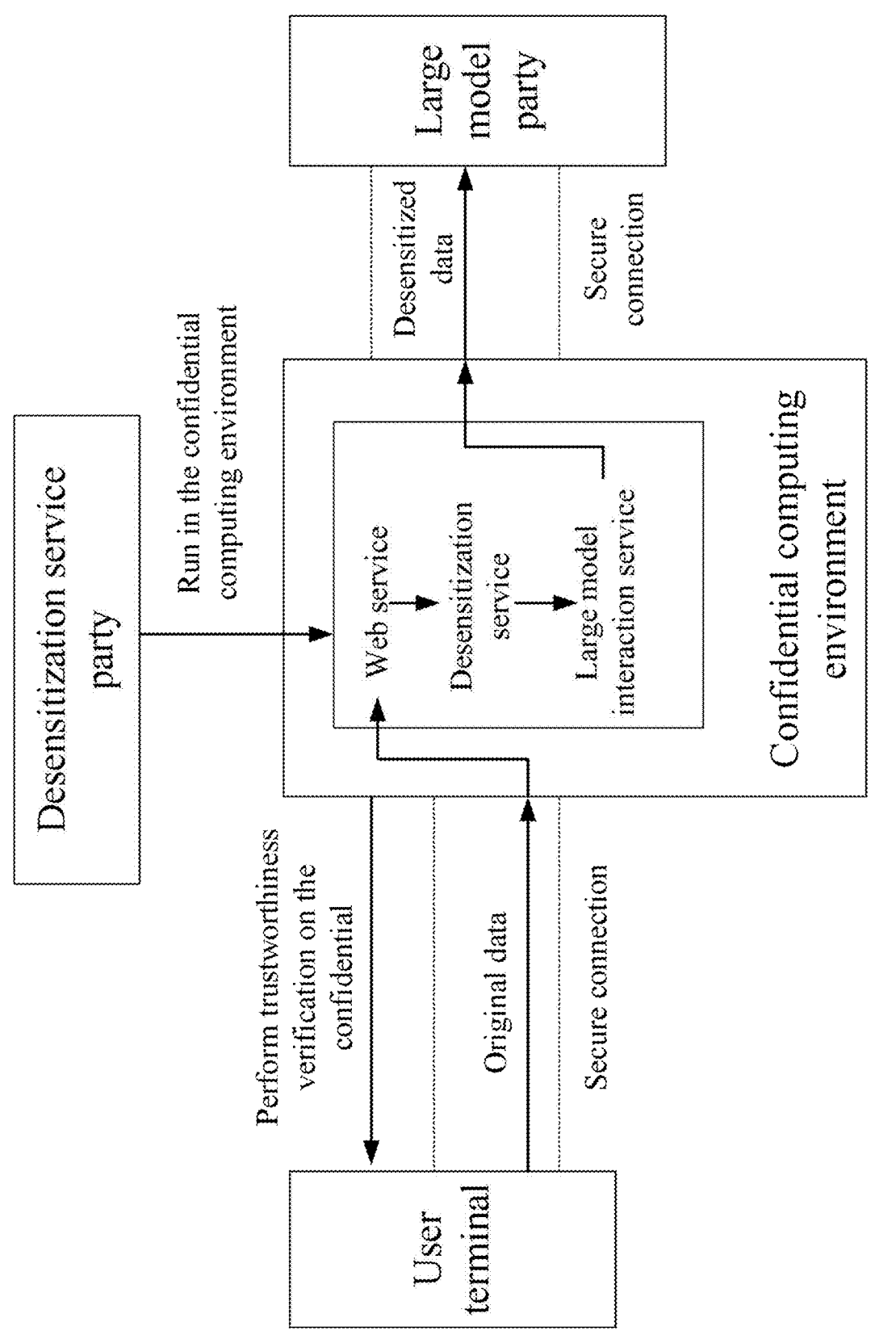
FIG. 3 is an architecture and implementation flowchart of a secure and trusted use system for a large model based on confidential computing according to Embodiment 3 of the present disclosure.

This embodiment is similar to Embodiment 1. The difference lies in that the Embodiment 1 is mainly applied to the scenario where users use large models for inference. In this embodiment, the above process can further be used in the large model training scenario, as shown in FIG. 3. For the large model training scenario, re-identification service is not required. There is no need for the mapping table between sensitive data and replacement data, nor is it necessary to seal the user name-token correspondence table.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

What is claimed is:

1. A secure and trusted use method for a large model based on confidential computing, comprising:

starting, by a desensitization service party, a service in a confidential computing environment;

performing, trustworthiness verification on the confidential computing environment by:

starting, by the service, a confidential computing environment service and invoking a chip-level confidential computing application programming interface (API) to generate a chip-level report;

generating, by the service, a public-private key pair P-S in the confidential computing environment, and issuing a self-signed certificate using a private key S;

sending, the chip-level report and the self-signed certificate to a user terminal;

and verifying, by the user terminal, the self-signed certificate using a public key P, validating authenticity of the chip-level report using a confidential computing certificate chain, and verifying validity of the service using service-related information in the chip-level report;

establishing, by the confidential computing environment, a secure connection with the user terminal after the user terminal performs trustworthiness verification on the confidential computing environment and verifies that the confidential computing environment is trustworthy based on the self-signed certificate and the chip-level report of the desensitization service party;

establishing, by the confidential computing environment, the secure connection with the large model;

receiving, by the service running in the confidential computing environment, authorization information uploaded by a user through the secure connection and required for the user to use the large model, and sealing the authorization information based on a trusted sealing technology for confidential computing;

receiving, by the service in the confidential computing environment, original data uploaded by the user terminal, and desensitizing the original data to obtain desensitized data;

wherein during desensitizing the original data, the service establishes a mapping table between sensitive data and corresponding replacement data in the confidential computing environment;

after desensitizing the original data to obtain the desensitized data, reading, by the service based on the trusted sealing technology, the authorization information corresponding to the user, and sending the authorization information to the large model through the secure connection between the confidential computing environment and the large model, to trigger use of the large model by the user;

and receiving, by the service, an inference result returned by the large model, restoring relevant desensitized data in the inference result to the sensitive data based on the mapping table, and then returning the inference result to the user terminal through the secure connection.

2. The secure and trusted use method for the large model based on confidential computing according to claim 1, wherein after the verification succeeds, the user terminal requests to establish a remote secure connection with the confidential computing environment using the self-signed certificate and the service-related information in the chip-level report.

3. The secure and trusted use method for the large model based on confidential computing according to claim 1, wherein the service running in the confidential computing environment provides the user terminal with a user web service interface containing a dialog box between the user and the large model, to receive the original data, and desensitizes the original data after receiving the original data.

4. A secure and trusted use system for a large model based on confidential computing, comprising: a user terminal including a memory and a hardware processor, a desensitization service party, and a large model, wherein the desensitization service party comprises a confidential computing environment, and the secure and trusted use system for the large model based on confidential computing is configured to implement the secure and trusted use method for the large model based on confidential computing, comprising:

starting, by the desensitization service party, a service in the confidential computing environment;

performing, trustworthiness verification on the confidential computing environment by:

starting, by the service, a confidential computing environment service and invoking a chip-level confidential computing application programming interface (API) to generate a chip-level report;

generating, by the service, a public-private key pair P-S in the confidential computing environment, and issuing a self-signed certificate using a private key S;

sending the chip-level report and the self-signed certificate to a user terminal;

and verifying, by the user terminal, the self-signed certificate using a public key P, validating authenticity of the chip-level report using a confidential computing certificate chain, and verifying validity of the service using service-related information in the chip-level report;

establishing, by the confidential computing environment, a secure connection with the user terminal after the user terminal performs trustworthiness verification on the confidential computing environment and verifies that the confidential computing environment is trustworthy based on the self-signed certificate and the chip-level report of the desensitization service party;

establishing, by the confidential computing environment, the secure connection with the large model;

receiving, by the service running in the confidential computing environment, authorization information uploaded by a user through the secure connection and required for the user to use the large model, and sealing the authorization information based on a trusted sealing technology for confidential computing;

receiving, by the service in the confidential computing environment, original data uploaded by the user terminal, and desensitizing the original data to obtain desensitized data;

wherein during desensitizing the original data, the service establishes a mapping table between sensitive data and corresponding replacement data in the confidential computing environment;

after desensitizing the original data to obtain the desensitized data, reading, by the service based on the trusted sealing technology, the authorization information corresponding to the user, and sending the authorization information to the large model through the secure connection between the confidential computing environment and the large model, to trigger use of the large model by the user;

and receiving, by the service, an inference result returned by the large model, restoring relevant desensitized data in the inference result to the sensitive data based on the mapping table, and then returning the inference result to the user terminal through the secure connection.

5. The secure and trusted use system for the large model based on confidential computing according to claim 4, wherein after the verification succeeds, the user terminal requests to establish a remote secure connection with the confidential computing environment using the self-signed certificate and the service-related information in the chip-level report.

6. The secure and trusted use system for the large model based on confidential computing according to claim 4, wherein the service running in the confidential computing environment provides the user terminal with a user web service interface containing a dialog box between the user and the large model, to receive the original data, and desensitizes the original data after receiving the original data.

* * * * *